US008445792B2

(12) United States Patent
Ito et al.

(10) Patent No.: US 8,445,792 B2
(45) Date of Patent: May 21, 2013

(54) LOAD DETECTION DEVICE WHICH DETERMINES LOAD ON A VEHICLE SEAT TAKING INTO ACCOUNT VEHICLE LONGITUDINAL INCLINATION ANGLE

(75) Inventors: Koji Ito, Yatomi (JP); Muneto Inayoshi, Nagoya (JP); Akira Enomoto, Kariya (JP); Hiroyuki Fujii, Kariya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 356 days.

(21) Appl. No.: 12/813,956

(22) Filed: Jun. 11, 2010

(65) Prior Publication Data
US 2011/0005843 A1 Jan. 13, 2011

(30) Foreign Application Priority Data

Jul. 8, 2009 (JP) ................. 2009-161878

(51) Int. Cl.
*G01G 19/08* (2006.01)
*B60R 21/015* (2006.01)
(52) U.S. Cl.
USPC .............. 177/136; 180/273; 280/735; 701/45
(58) Field of Classification Search
USPC ...... 177/136, 144; 180/273; 280/735; 701/45
See application file for complete search history.

(56) References Cited

U.S. PATENT DOCUMENTS

| 4,691,792 A | * | 9/1987 | Shintani ............................. 177/1 |
|---|---|---|---|
| 5,161,628 A | * | 11/1992 | Wirth ............................. 177/137 |
| 5,898,135 A | * | 4/1999 | Nakazaki ........................ 177/136 |
| 6,364,352 B1 | * | 4/2002 | Norton ........................... 280/735 |
| 6,748,814 B2 | | 6/2004 | Ishida et al. |
| 6,774,319 B2 | * | 8/2004 | Aoki et al. ..................... 177/144 |
| 6,786,104 B1 | | 9/2004 | Aoki |
| 6,794,586 B1 | * | 9/2004 | Mason ........................ 177/25.15 |
| 6,840,119 B2 | | 1/2005 | Aoki |
| 7,048,085 B2 | * | 5/2006 | Lichtinger et al. ............. 180/273 |
| 2001/0010424 A1 | * | 8/2001 | Osmer et al. ................... 280/735 |
| 2002/0003344 A1 | * | 1/2002 | Maeda ........................... 280/733 |
| 2002/0038947 A1 | * | 4/2002 | Baba et al. ..................... 280/735 |
| 2006/0217864 A1 | * | 9/2006 | Johnson et al. .................. 701/45 |
| 2011/0010056 A1 | * | 1/2011 | Inayoshi et al. ................. 701/45 |

FOREIGN PATENT DOCUMENTS

| JP | 2001-150997 A | 6/2001 |
|---|---|---|
| JP | 2002-318113 A | 10/2002 |
| JP | 3904913 B2 | 4/2007 |

* cited by examiner

*Primary Examiner* — Randy W Gibson
(74) *Attorney, Agent, or Firm* — Buchanan Ingersoll & Rooney PC

(57) ABSTRACT

A load detection device includes a load sensor provided at a support portion that is positioned at a rear portion of a seat for a vehicle, the seat including a seatback at the rear portion of the seat, the load sensor detecting a load applied to the support portion that is a part of a plurality of support portions, a load detecting portion detecting a portion of a load of a seat occupancy of the seat based on an output from the load sensor and outputting a detected load value, a longitudinal inclination angle detecting portion detecting a longitudinal inclination angle of the vehicle, and a load correcting portion correcting, depending on the longitudinal inclination angle, the detected load value of the portion of the load of the seat occupancy based on a relationship between the detected load value of the seat occupancy and the longitudinal inclination angle.

4 Claims, 5 Drawing Sheets

LOAD DETECTION DEVICE WHICH DETERMINES LOAD ON A VEHICLE SEAT TAKING INTO ACCOUNT VEHICLE LONGITUDINAL INCLINATION ANGLE

CROSS REFERENCE TO RELATED APPLICATIONS

This application is based on and claims priority under 35 U.S.C. §119 to Japanese Patent Application 2009-161878, filed on Jul. 8, 2009, the entire content of which is incorporated herein by reference.

TECHNICAL FIELD

This disclosure relates to a load detection device.

BACKGROUND DISCUSSION

In order to improve various safety devices such as a seatbelt and an air bag mounted at a vehicle, the safety devices may be controlled depending on a weight of a passenger seated on a seat of the vehicle. For example, in a case where the passenger is seated on the seat without fastening the seatbelt, a warning is generally issued to indicate that the seatbelt is not fastened. In addition, according to the United States regulations, the air bag must be deployed at a time of an accident such as a collision when an adult passenger is seated on a front passenger seat. Further, in a case where a child restraint system (i.e., a child seat) is backwardly fastened to the passenger seat so that an infant faces a driver of the vehicle, an impact caused by the deployment of the air bag may be adversely affected to the infant. Therefore, in such state, the deployment of the air bag is prohibited according to the US regulations. The determination of the adult passenger is based on a weight of an adult female having a small physique. As for the determination of the infant, certain criteria are also specified. The accurate detection and determination of the passenger's weight are extremely important in view of safety.

An example of an apparatus for measuring a passenger's weight, i.e., a load applied to a support portion of a seat is disclosed in JP3904913B (hereinafter referred to as Reference 1). According to a load detection mechanism for a vehicle seat disclosed in Reference 1, load detecting means achieved by strain gauges are arranged at four portions, respectively, serving as the support portions, between lower rails attached to the seat and leg portions attached to a vehicle floor. Loads detected at the aforementioned four portions are added up to thereby obtain the load of the passenger. In addition, the load detection mechanism disclosed in Reference 1 is not required to precisely detect the load for determining whether or not the passenger is seated on the seat, and whether the passenger is the infant or the adult. Therefore, the load detecting means may be provided at only some of the support portions of the seat to detect a portion of the load. A seat weight measuring device disclosed in JP2001-150997A (hereinafter referred to as Reference 2), which includes three support portions at front left and right, and a rear center of the seat, includes a load sensor only at the rear center of the seat. Thus, the number of load sensors decreases, which results in a reduction of parts costs, assembling costs, and wiring costs.

According to the seat weight measuring device that detects a portion of the load disclosed in Reference 2, the cost reduction is achieved. However, because a detected load value may change depending on an inclination angle of the vehicle, the determination accuracy may decrease compared to the apparatus disclosed in Reference 1 that detects the full load applied to the seat. For example, a smaller ratio of the load of a passenger or luggage on the seat is received by the load sensor arranged at the rear of the seat when the vehicle is being driven on a downhill rather than on a horizontal surface. Thus, even when the passenger on the seat is an adult, it may be determined that an infant or a child is seated on the seat.

A need thus exists for a load detection device which is not susceptible to the drawback mentioned above.

SUMMARY

According to an aspect of this disclosure, a load detection device includes a load sensor provided at a support portion that is positioned at a rear portion of a seat for a vehicle, the seat including a seatback at the rear portion of the seat, the load sensor detecting a load applied to the support portion that is a part of a plurality of support portions supporting the seat, a load detecting portion detecting a portion of a load of a seat occupancy of the seat based on an output from the load sensor and outputting a detected load value, a longitudinal inclination angle detecting portion detecting a longitudinal inclination angle of the vehicle, and a load correcting portion correcting, depending on the longitudinal inclination angle of the vehicle, the detected load value of the portion of the load of the seat occupancy detected by the load detecting portion based on a relationship between the detected load value of the seat occupancy of the seat and the longitudinal inclination angle of the vehicle.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
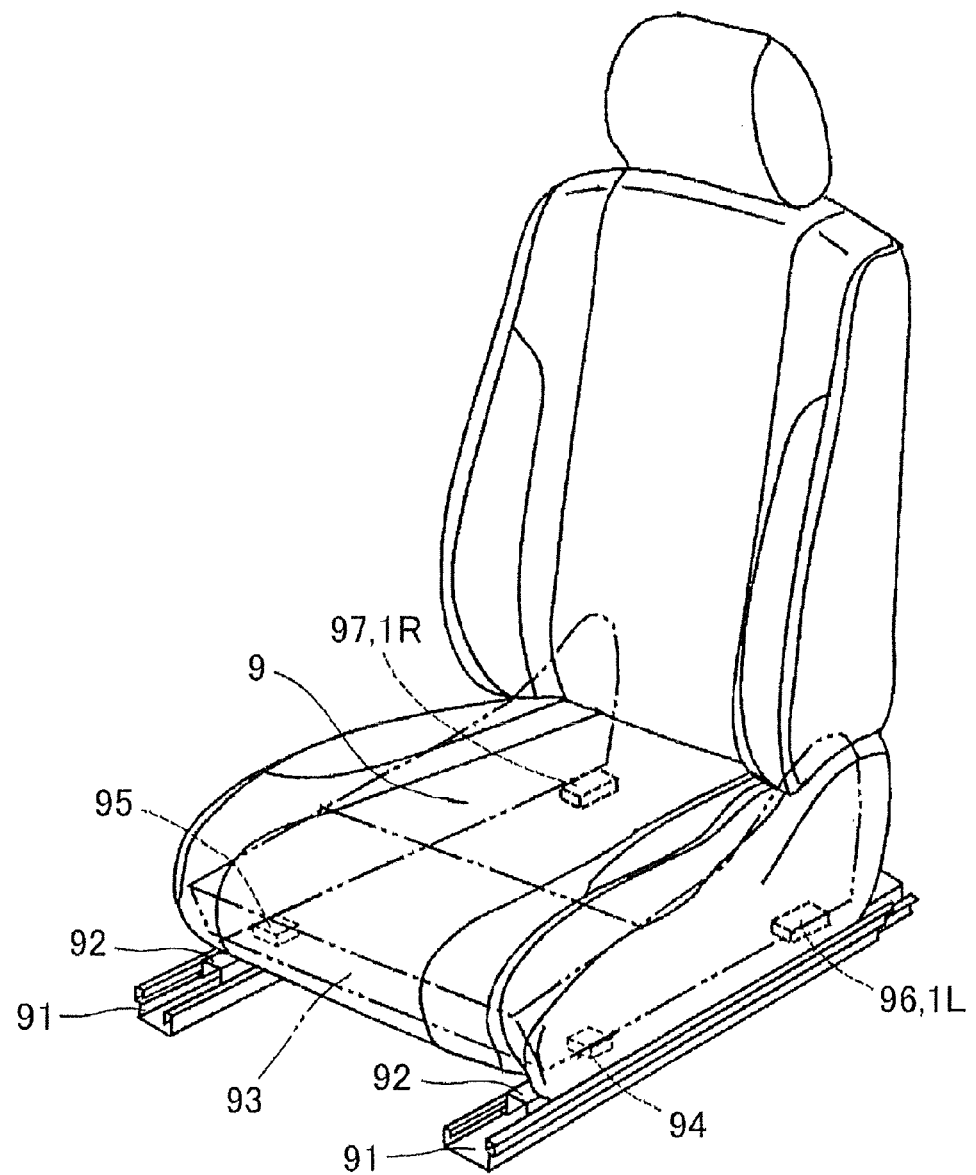
FIG. 1 is a diagram illustrating a passenger seat where a load detection device according to an embodiment disclosed here is provided.

An embodiment disclosed here will be explained with reference to FIGS. 1 to 5. As illustrated in FIG. 1, a front passenger seat 9 (hereinafter simply referred to as a seat 9), where a load detection device 1 according to the present embodiment is provided, is movably arranged in a longitudinal direction of a vehicle by means of a sliding mechanism that includes a pair of lower rails 91 and a pair of upper rails 92 both of which extend in the longitudinal direction of the vehicle. The seat 9 includes a seatback at a rear portion of the seat 9. A lower frame 93 covered by a cushion of the seat 9 is supported by the upper rails 92. Specifically, support portions 94, 95, 96, and 97 attached at four corners of a lower surface of the lower frame 93 achieve the support of the lower frame 93 at the upper rails 92. The support portions 94 and 95, arranged at a front side of the lower frame 93 while being away from each other in a width direction of the vehicle, simply support a load applied to the seat 9. On the other hand, the support portions 96 and 97 arranged at a rear side of the lower frame 93 while being away from each other in the width direction detect the load applied to the seat 9. That is, the support portions 96 and 97 serve as a rear-left load sensor 1L and a rear-right load sensor 1R, respectively.

Figure 2:
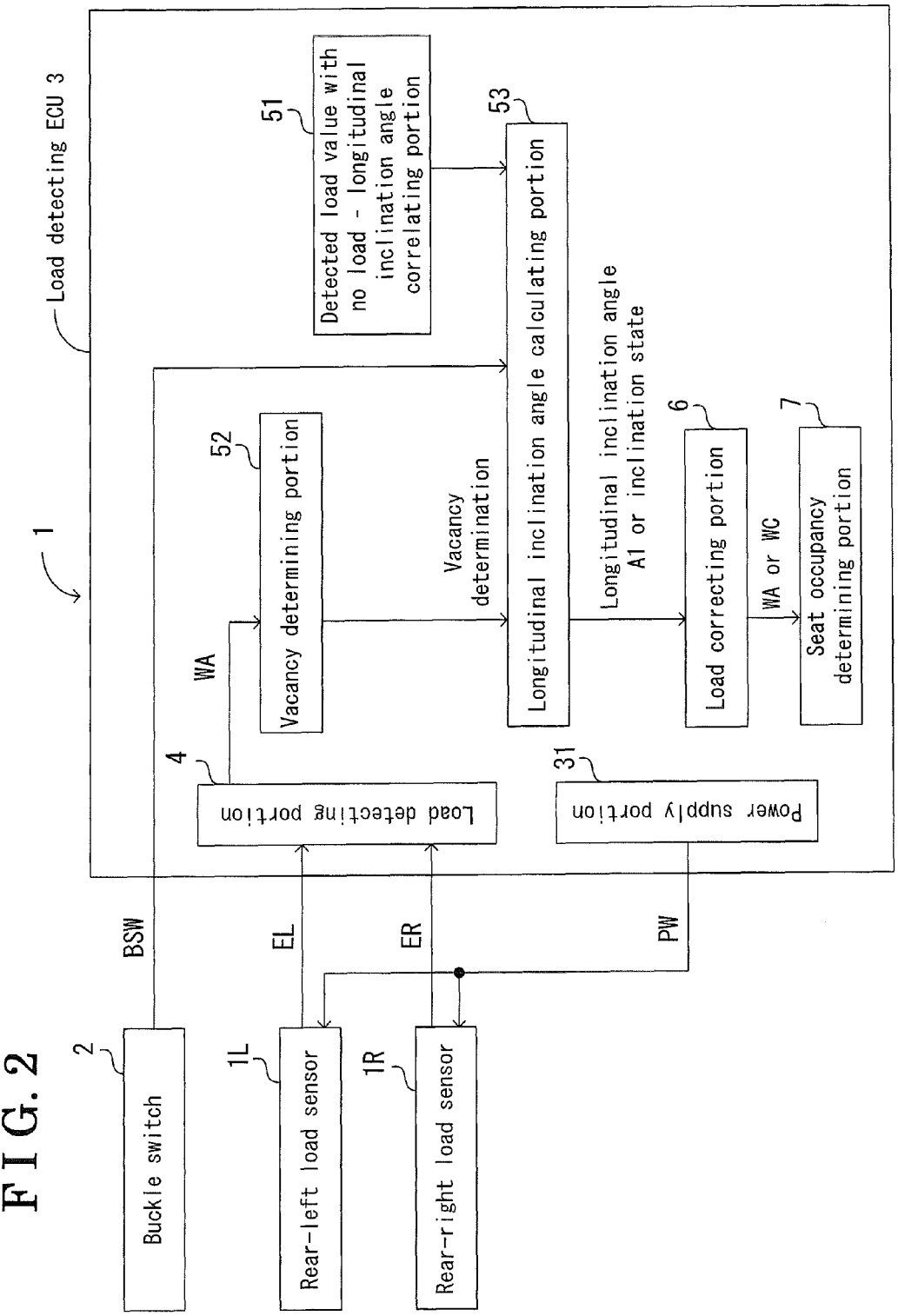
FIG. 2 is a structural view of the load detection device according to the embodiment.

The load detection device 1 according to the embodiment also includes a function to detect a longitudinal inclination angle of the vehicle. The longitudinal inclination angle is measured in a state where the seat 9 is vacant, i.e., a passenger or luggage is not seated or placed on the seat 9 (no seat occupancy). In a state where the passenger or luggage is seated or placed on the seat 9, a portion of the load of the passenger or luggage is detected to identify and determine the seat occupancy. As illustrated in FIG. 2, the load detection device 1 includes the rear-left load sensor 1L, the rear-right load sensor 1R, a buckle switch 2, and a load detecting ECU 3.

The load sensors 1L and 1R are strain gauge sensors. Electrical outputs EL and ER from the load sensors 1L and 1R are received by a load detecting portion 4 of the load detecting ECU 3. Electric power PW is selectively supplied to the load sensors 1L and 1R from an electric power supply portion 31 of the load detecting ECU 3 as necessary. The buckle switch 2 is provided at a buckle for fastening a seatbelt that is provided at the seat 9 so as to detect whether or not the seatbelt is fastened. A buckle switch information BSW output from the buckle switch 2 is received by the load detecting ECU 3. The load detecting ECU 3 is an electronic control device that includes a calculating portion, a storing portion, an inputting portion, and an outputting portion and that is operated by software. Various functioning portions such as the load detecting portion 4, a detected load value at no load and longitudinal inclination angle correlating portion 51 serving as a correlating portion (hereinafter simply referred to as a correlating portion 51), a vacancy determining portion 52, a longitudinal inclination angle calculating portion 53, a load correcting portion 6, and a seat occupancy determining portion 7 which will be explained later are mainly achieved by software.

The load detecting portion 4 serves as an input portion of the load detecting ECU 3 and includes an A/D converter. The load detecting portion 4 adds up the electrical outputs EL and ER of both the load sensors 1L and 1R, and obtains and outputs a detected load value WA (unit: N or kgw) based on the aforementioned electrical outputs EL and ER by using a predetermined conversion formula.

A zero point adjustment is conducted beforehand on the load detecting portion 4 and the detected load value WA. At a time of the zero point adjustment, the own weight of the seat 9 is partially applied to both the load sensors 1L and 1R in a basic state where the vehicle is prevented from being inclined and the passenger or luggage is not seated or placed on the seat 9. At this time, each of the electrical outputs EL and ER is adjusted to become zero. Alternatively, various constants of the predetermined conversion formula of the load detecting portion 4 are determined so that the detected load value WA becomes zero while the electrical outputs EL and ER are not zero. Because of the zero point adjustment, the detected load value WA corresponds to the load of the seat occupancy of the seat 9, excluding the own weight of the seat 9.

Following the zero point adjustment, the correlating portion 51 indicating a relationship between a detected load value at no load WA0 output from the load detecting portion 4 in a state of no seat occupancy of the seat 9 and a vehicle longitudinal inclination angle A1 is obtained beforehand. The correlating portion 51 is obtained by an acquisition of the detected load value WA when the vehicle is inclined in the longitudinal direction thereof in the vacancy state of the seat 9. That is, the detected load value WA at this time is the detected load value at no load WA0, of which a relationship to the longitudinal inclination angle A1 is stored in the storing portion as a correlation map or a function formula, for example, to thereby obtain the correlating portion 51. According to the present embodiment, the greater ratio of the own weight of the seat 9 is applied to the front support portions 94 and 95 in a case where the front of the vehicle is facing downhill. The electrical outputs EL and ER of both the load sensors 1L and 1R of the rear support portions 96 and 97 decrease so that the detected load value at no load WA0 decreases to a negative value (negative side). On the other hand, the greater ratio of the own weigh of the seat 9 is applied to the rear support portions 96 and 97 in a case where the front of the vehicle is facing uphill. The detected load value at no load WA0 decreases to a positive value (positive side).

Figure 3:
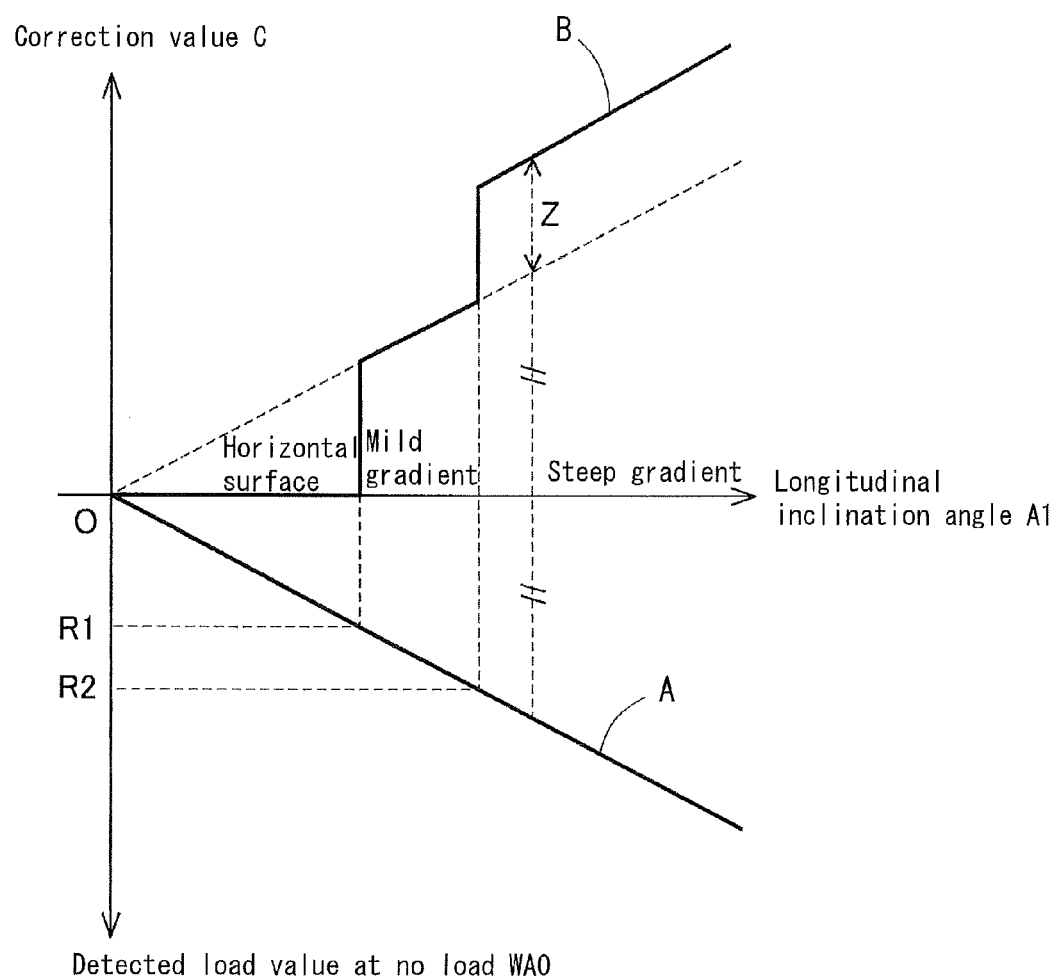
FIG. 3 is a graph illustrating examples of a correlating portion and a correction value according to the embodiment.

FIG. 3 is a graph illustrating the correlating portion 51 and an example of a correction value C in accordance with a structure in FIG. 2. A horizontal axis in FIG. 3 indicates the longitudinal inclination angle A1 in a state where the front of the vehicle is facing downhill. A negative side of a vertical axis in FIG. 3 is a graph A of the detected load value at no load WA0 while a positive side of the vertical axis in FIG. 3 is a graph B of the correction value C. An origin 0 of the graph A of the detected load value at no load WA0 is obtained by the aforementioned zero point adjustment so that the detected load value at no load WA0 (unit: N or kgw) is adjusted to be zero when the longitudinal inclination angle A1 is equal to 0 degree. In FIG. 3, the detected load value at no load WA0 and the longitudinal inclination angle A1 are proportional to each other.

Further, a vacancy determination value W0, which is greater than a fluctuation range of the detected load value at no load WA0, is specified beforehand. The vacancy determination value W0 is not specified to be zero so as to avoid failing to determine the vacancy of the seat 9 because of the positive value of the detected load value at no load WA0 at a time when the vehicle is stopped uphill.

The vacancy determining portion 52 determines the vacant state of the seat 9 based on the detected load value WA output from the load detecting portion 4. In a case where the detected load value WA is smaller than the vacancy determination value W0, the vacancy determining portion 52 determines the vacant state of the seat 9.

The longitudinal inclination angle calculating portion 53 calculates the vehicle longitudinal inclination angle A1 correlated to the detected load value WA output from the load detecting portion 4 based on the correlating portion 51 in a case where the vacancy determining portion 52 determines the vacant state of the seat 9. The calculation by the longitudinal inclination angle calculating portion 53 corresponds to an acquisition of the longitudinal inclination angle A1 correlated to the detected load value WA by a search through the correlation map or to a calculation of the longitudinal inclination angle A1 by a substitution of the detected load value WA to the function formula, for example. Further, according to the present embodiment, the longitudinal inclination angle calculating portion 53 recognizes the vehicle longitudinal inclination angle A1 as a road surface gradient. Then, as illustrated in FIG. 3, the longitudinal inclination angle calculating portion 53 divides or classifies the road surface gradient into three stages by a usage of a mild down gradient determination value R1 and a steep down gradient determination value R2. That is, when the detected load value WA is equal to or greater than the mild down gradient determination value R1 towards the positive side, the road surface gradient is determined to be horizontal. When the detected load value WA is equal to or greater than the steep down gradient determination value R2 and is smaller than the mild down gradient determination value R1, the road surface gradient is determined to be mild (i.e., a mild gradient). When the detected load value WA is smaller than the steep down gradient determination value R2, the road surface gradient is determined to be steep (i.e., a steep gradient). That is, when the vehicle is positioned on one of the aforementioned three stages of the road surface gradient, it is determined that an inclination state of the vehicle is classified into one of multiple (for example, three) inclination states.

The correlating portion 51, the vacancy determining portion 52, and the longitudinal inclination angle calculating portion 53 constitute a longitudinal inclination angle detecting portion. Thus, software such as an inclination angle sensor for detecting a longitudinal inclination angle of the vehicle is not provided according to the present embodiment.

The load correcting portion 6 corrects the detected load value WA output from the load detecting portion 4 in a state of no seat occupancy of the seat 9, on the basis of the longitudinal inclination angle A1. The load correcting portion 6 obtains and stores beforehand the correction value C added to the detected load value WA. The correction value C is specified on a basis of a preliminary experiment result where a relationship between the detected load value WA and the longitudinal inclination angle A1 is obtained in a state where multiple adult passengers are seated on the seat 9 in turns and the front side of the vehicle is being descended. Specifically, as illustrated in graph B in FIG. 3, the correction value C is defined to be zero when the road surface is horizontal. The correction value C is defined to be a value of which the sign is inverted relative to the sign of the negative value of the detected load value at no load WA0 when the road surface is the mild gradient. The correction value C is defined to be a value of which the sign is inverted relative to the sign of the negative value of the detected load value at no load WA0 and the correction value C additionally includes a predetermined load value Z when the road surface gradient is steep. In an actual operation, no correction is made when the road surface is horizontal. In cases of the mild gradient and the steep gradient, a corrected load value WC is obtained by an addition of the correction value C to the detected load value WA output from the load detecting portion 4.

The seat occupancy determining portion 7 determines the seat occupancy such as the passenger seated on the seat 9 by comparing the detected load value WA or the corrected load value WC with a predetermined adult determination value W1 and a predetermined average adult male determination value W2. The adult determination value W1 is specified on a basis of a weight of an adult female having a small physique, for example, a $5^{th}$ percentile of weights of adult females. The average adult male determination value W2 is specified on a basis of a weight of the average adult male, i.e., the $50^{th}$ percentile of weights of adult males. The seat occupancy determining portion 7 refers to the buckle switch information BSW and performs a continuous determination each predetermined time period using a timer. A detailed function of the seat occupancy determining portion 7 will be explained in a load detection flow described below.

Figure 4:
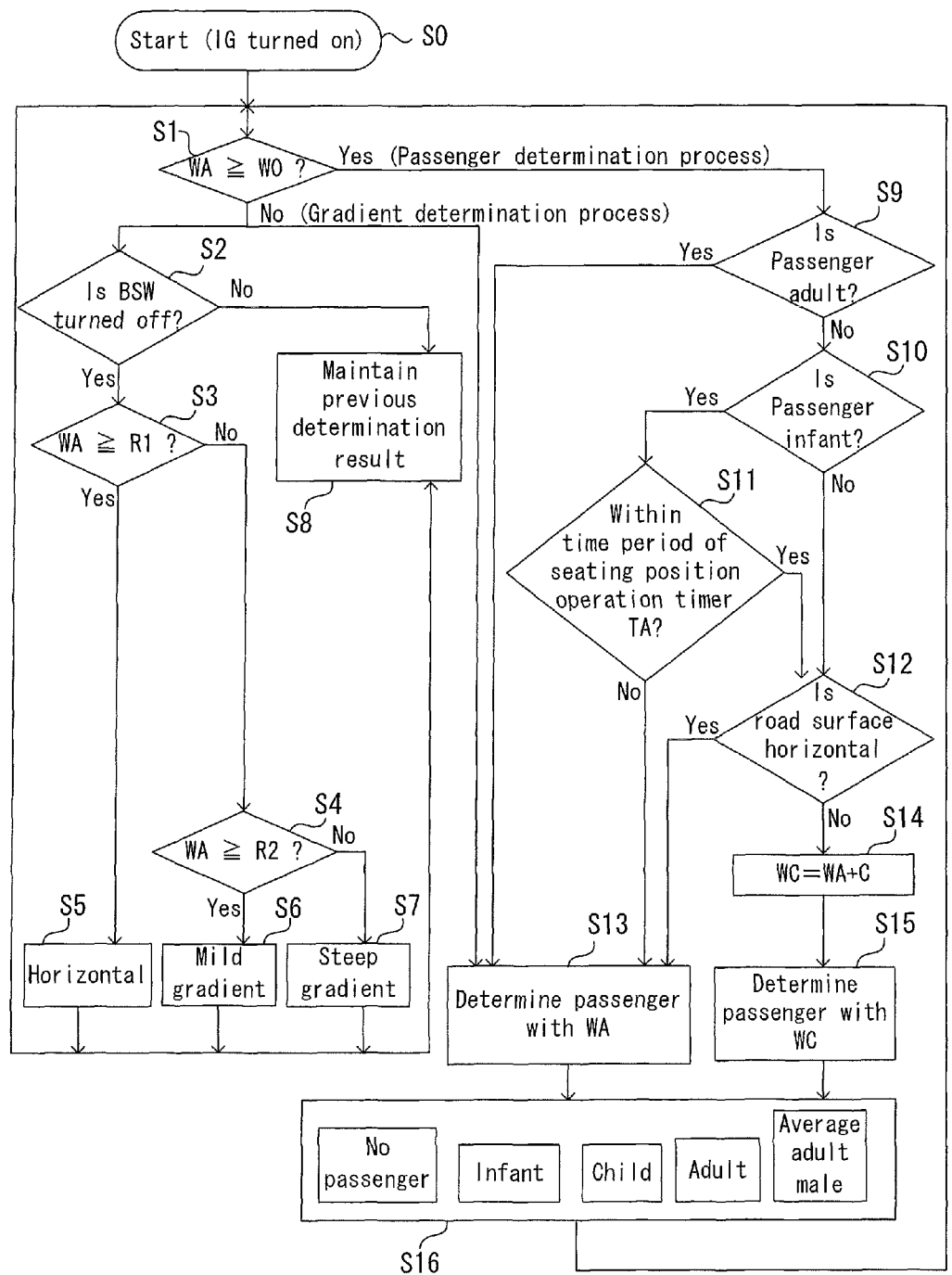
FIG. 4 is a load detection flow explaining an operation, a calculation, and a process performed by the load detection device according to the embodiment.

An operation, a calculation, and a process of the load detection device 1 according to the present embodiment will be explained with reference to the load detection flow shown in FIG. 4. In the load detection flow, the inclination of the road surface is determined, if possible, at a time of a start of the vehicle. Then, a load applied to the seat 9 such as the passenger of the seat 9 is partially detected for the determination of the passenger. As illustrated in FIG. 4, in a case where an ignition switch is turned on in step S0, the operation of the load detection flow performed by the load detecting ECU 3 is started. Then, the vacancy determining portion 52 determines the vacant state of the seat 9 when the detected load value WA is smaller than the vacancy determination value W0. As a result, the flow operation is shifted to a gradient determination process in steps S2 to S8 and to a passenger determination with no correction process in step S13. On the other hand, the vacancy determining portion 52 determines the passenger seated on the seat 9 when a state where the detected load value WA is equal to or greater than the vacancy determination value W0 is maintained for a predetermined time period. The flow operation is then shifted to a passenger determination process in steps S9 to S16.

After the vacant state of the seat 9 is determined, the longitudinal inclination angle calculating portion 53 performs the gradient determination process in steps S2 to S8. In step S2, the longitudinal inclination angle calculating portion 53 checks the buckle switch information BSW. When it is determined that the buckle switch information BSW is in an off state, the detected load value WA is compared with each of the mild down gradient determination value R1 and the steep down gradient determination value R2 in steps S3 and S4, respectively. Depending on the comparison result, the road surface is determined to be horizontal in step S5, the mild gradient in step S6, or the steep gradient in step S7. The gradient state of the road surface is newly obtained so as to update the previous gradient determination result. When the buckle switch information BSW is in an on state in step S2, it is concluded that the passenger or luggage is seated or placed on the seat 9 and therefore the gradient determination is not achievable. As a result, the previous gradient determination result is maintained in step S8. The flow operation is returned to step S1.

According to the aforementioned flow, in a case where the seat 9 is actually vacant, the vacant state of the seat 9 is determined in step S1. The road surface gradient is determined in steps S2 to S7 and "no passenger" is determined in the passenger determination with no correction process in step S13 which will be explained later. On the other hand, when the passenger is actually seated on the seat 9, the detected load value WA becomes equal to or greater than the vacancy determination value W0 so that the flow operation is normally shifted to the passenger determination process from step S9. In addition, even when the passenger is seated on the seat 9, the sufficient detected load value WA may not be detected in a state where the passenger adjusts his/her posture or seating position. In that case, the vacant state of the seat 9 is determined. At this time, it is confirmed that the seatbelt is fastened in step S2 and thus the gradient determination is not conducted. The previous gradient determination result is maintained accordingly. Further, in the passenger determination with no correction process in step S13, the passenger determination is performed with the stable detected load value WA after the passenger changes his/her posture or seating position.

In the passenger determination process after it is determined that the passenger is seated on the seat 9, the load correcting portion 6 performs operations in steps S9 to S12 and S14 and the seat occupancy determining portion 7 performs operations in steps S13, S15, and S16. In step S9, when a state where the detected load value WA is equal to or greater than the adult determination value W1 is maintained for a predetermined time period, the load correcting portion 6 determines that the adult passenger is seated on the seat 9 and the flow operation is shifted to step S13. When the negative determination is made in step S9, the flow operation is shifted to step S10. In step S10, when the detected load value WA is equal to or greater than the vacancy determination value W0 and is smaller than the adult determination value W1 with the on state of the buckle switch information BSW, it is determined that the infant passenger is seated on the seat 9. When the negative determination is made in S10, the flow operation is shifted to step S12. In step S11, when the determination of the infant is maintained for a time period of a seating position operation timer TA (i.e., the negative determination is made), the flow operation is shifted to step S13. When the time period of the seating position operation timer TA does not elapse, the flow operation is shifted to step S12. In step S12, the correction of the detected load value WA is not conducted in a case where it is determined that the road surface is horizontal by the gradient determination process in steps S2 to S8. The flow operation is then shifted to step S13. In a case where the mild gradient or the steep gradient of the road surface is determined, the flow operation is shifted to step S14 where the correction value C is added to the detected load value WA to acquire the corrected load value WC. The flow operation is then shifted to step S15.

In the passenger determination with no correction process in step S13, the seat occupancy determining portion 7 concludes the determination of the passenger by using the detected load value WA. In the passenger determination with correction process in step S15, the seat occupancy determining portion 7 concludes the determination of the passenger by using the corrected load value WC. According to the determination in step S16, specifically, "no passenger" is determined when the detected load value WA or the corrected load value WC is smaller than the vacancy determination value W0. In addition, it is determined that the infant is seated on the seat 9 when the detected load value WA or the corrected load value WC is equal to or greater than the vacancy determination value W0 and is smaller than the adult determination value W1, as long as the buckle switch information BSW is in the on state. At this time, when the buckle switch information BSW is in the off state, it is determined that the child is seated on the seat 9. Further, it is determined that the adult is seated on the seat 9 when the detected load value WA or the corrected load value WC is equal to or greater than the adult determination value W1 and is smaller than the average adult male determination value W2. Furthermore, it is determined that the average adult male is seated on the seat 9 when the detected load value WA or the corrected load value WC is equal to or greater than the average adult male determination value W2. The aforementioned determinations are concluded when a state where the detected load value WA or the corrected load value WC falls within the corresponding range is maintained for a predetermined time period.

In the aforementioned determination results, more specifically, the above-mentioned "infant" is seated on a child seat fastened to a seatbelt. The above-mentioned "child" whose weight is lighter than the adult is not equipped with the seatbelt. The above-mentioned "adult" has the weight equal to or greater than the adult female having the small physique and smaller than the average adult male. The above-mentioned "average adult male" has a weight equal to or greater than the weight of the average adult male.

The seating position operation timer TA is used in step S11 so that even when the insufficient detected load value WA is detected because of the transient seating position or the seating posture of the passenger in a case where the adult passenger is seated on the seat 9, the determination of the passenger is not concluded and is finally concluded when the seating position or the posture of the passenger is stabled and the sufficient detected load value WA is detected.

After the determination result is concluded, a momentary change of the detected load value WA is regarded as being caused by the position change of the passenger or the vibration generated upon driving of the vehicle. The determination result is therefore prevented from being changed. In addition, even after the determination result is concluded, the occurrence of the continuous change of the detected load value WA or the change of the state of the buckle switch information BSW may be caused by egress and ingress by the passenger, and the like. Thus, the determination of the passenger is again performed back to step S1 from step S16.

Based upon the passenger determination result in step S16 mentioned above, the deployment level, the deployment speed, and the like of the air bag upon collision of the vehicle are controllable so as to comply with the United States (US) regulations. According to the US regulations, the deployment of the air bag is mandatory upon collision of the vehicle in a case where the "adult" is seated on the seat. In a case where the "infant" is seated on the seat, the deployment of the air bag is prohibited upon collision. In a case where the "child" who has the intermediate weight between the infant and the adult is seated on the seat, no mandatory is applied to the deployment of the air bag. Further, when the "adult" having the weight equal to or greater than the "average adult male" is seated on the seat, the deployment of the air bag must be fast and otherwise the deployment speed must be slow.

Figure 5A:
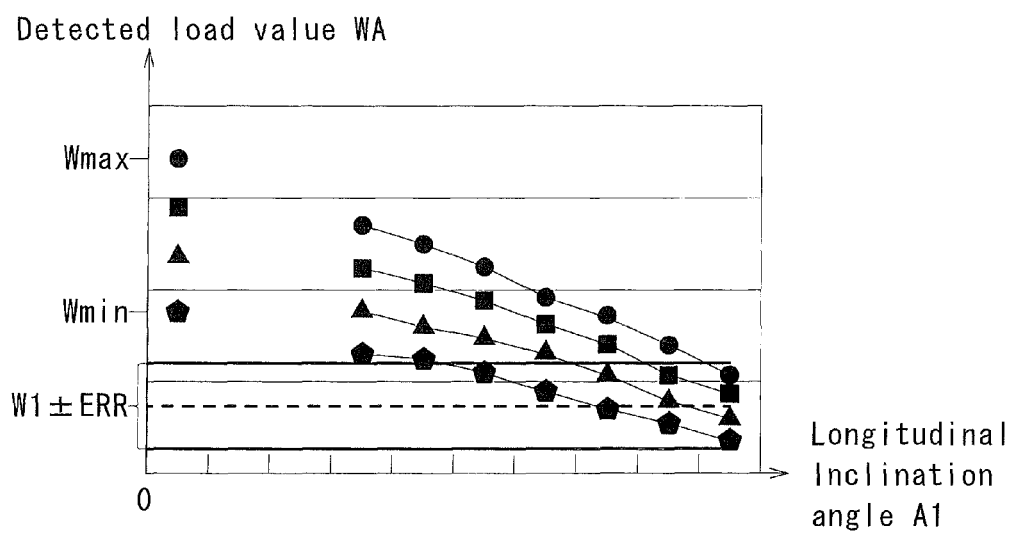
FIG. 5A is a characteristics graph in a case where a correction of a detected load value is not conducted and FIG. 5B is a characteristics graph in a case where the correction is conducted by a load correcting portion.
Figure 5B:
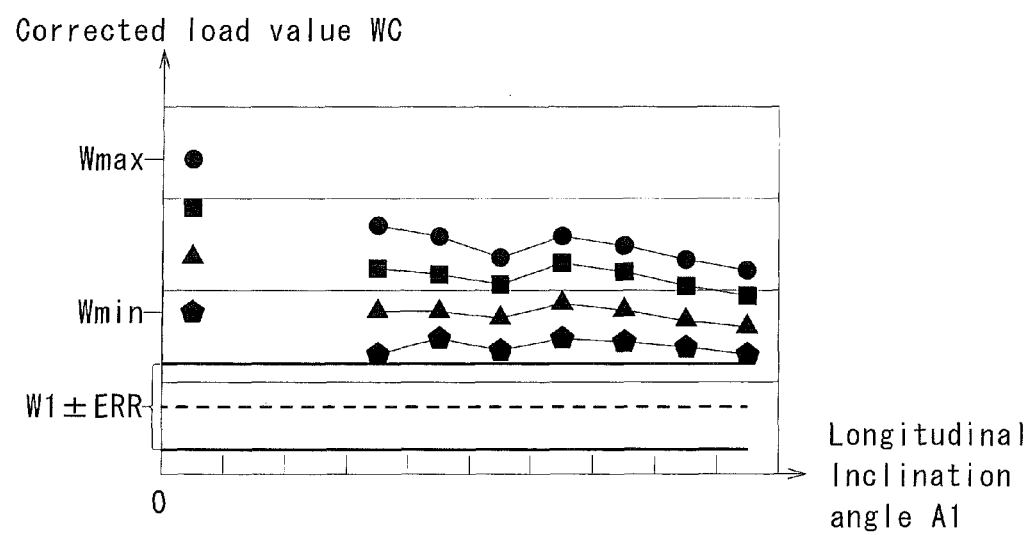

Next, effects of the load detection device 1 according to the present embodiment, specifically, the correction of the detected load value WA based on the longitudinal inclination angle A1 (road surface gradient), will be explained with reference to FIGS. 5A and 5B. FIG. 5A is a characteristics graph in a case where the correction is not conducted while FIG. 5B is a characteristics graph in a case where the correction is conducted by the load correcting portion 6. A horizontal axis in each FIG. 5A and FIG. 5B indicates the longitudinal inclination angle A1 in a state where the front side of the vehicle is lowered on the downhill. A vertical axis in FIG. 5A indicates the detected load value WA. FIG. 5A shows results of a preliminary experiment where a relationship between the detected load value WA and the longitudinal inclination angle A1 is obtained by multiple adults being seated on the seat 9 in turn. A vertical axis in FIG. 5B indicates the corrected load value WC obtained by an addition of the correction value C shown in graph B in FIG. 3 to the detected load value WA. In addition, the adult determination value W1 for determining the "adult" is indicated in each FIG. 5A and FIG. 5B so as to include a fluctuation ERR caused by variations of sensor sensitivity (which is shown by "W1±ERR" in each FIG. 5A and FIG. 5B).

In FIG. 5A, the detected load value WA when the vehicle is driven on a horizontal surface as shown in the left end in the graph varies within a range from Wmin to Wmax depending on the weights of the passengers being tested. However, the variations of the detected load value WA exceed the range of the adult determination value W1 (i.e., "W1±ERR" in FIG. 5A). Thus, the "adult" is correctly determined. However, the detected load value WA is gradually decreasing in association with an increase of the longitudinal inclination angle A1 so as to overlap the range of the adult determination value W1, which prevents the correct determination of the "adult" passenger.

In FIG. 5B, the corrected load value WC varies within the range from Wmin to Wmax as in FIG. 5A. The characteristics graph of FIG. 5B indicating the corrected load value WC is substantially horizontal and is prevented from overlapping the range of the adult determination W1. That is, the corrected load value WC is not influenced by the longitudinal inclination angle A1 so as to correctly detect a portion of the load of the seat occupancy, thereby appropriately determining the "adult" passenger.

As mentioned above, according to the load detection device 1 of the present embodiment, the detected load value WA detected by both the load sensors 1L, 1R and the load detecting portion 4 is corrected depending on the vehicle longitudinal inclination angle A1 detected by the longitudinal inclination angle detecting portion (i.e., the correlating portion 51, the vacancy determining portion 52, and the longitudinal inclination angle calculating portion 53). Therefore, the influence caused by the longitudinal inclination angle A1 is decreased to thereby correctly detect a portion of the load of the seat occupancy of the seat 9, which results in a highly accurate determination of whether the seat occupancy is the adult or the infant.

In addition, the rear-left load sensor 1L and the rear-right load sensor 1R arranged at the rear of the seat 9 while being away from each other in the vehicle width direction receive a detected load value corresponding to more than a half of the load of the passenger seated on the seat 9. Thus, highly accurate determination of whether the passenger seated on the seat 9 is the adult or the infant is achieved. Further, because the outputs from both the load sensors 1L and 1R are added up for determination, the detected load value WA is not influenced by a case where the vehicle is inclined either left or right, or a case where the passenger is seated so as to be inclined to the left or right side of the seat 9. The highly accurate detection and determination are achieved accordingly.

According to the present embodiment, the corrected load value WC is obtained by adding the correction value C to the detected load value WA. Alternatively, the detected load value WA may be multiplied by a correction magnification that increases in association with an increase of the longitudinal inclination angle A1. Further, the longitudinal inclination angle A1 may not be substituted or replaced by the three stages of the gradient state of the road surface and remain as angle information. Then, the load correcting portion 6 may be configured in such a manner that the corrected load value WC is obtained by means of a function including the longitudinal inclination angle A1 as a parameter.

Further, the detection of the longitudinal inclination angle A1 or the determination of the road surface gradient may be performed as long as the seat 9 is in the vacant state, even when the vehicle is in a stopped state and the ignition switch IG is turned off. In this case, in view of an operation of the load sensors 1L and 1R over a relatively longer period of time after the stop of the vehicle, a sampling period T1 of the electrical outputs EL and ER of the load sensors 1L and 1R, respectively, may be specified to be longer. Then, the power PW is intermittently supplied to both the load sensors 1L and 1R to achieve a power saving by which an electrical discharge of a battery mounted at the vehicle is reduced. In addition, because the longitudinal inclination angle A1 is represented by the three stages of the gradient state of the road surface, the subsequent calculation or process may be simplified and effective, which leads to a reduction of a calculation load to achieve saving power.

The longitudinal inclination angle detecting portion is constituted by the correlating portion 51, the vacancy determining portion 52, and the longitudinal inclination angle calculating portion 53. The aforementioned three portions are obtained by software of the load detecting ECU 3. Accordingly, hardware such as an inclination sensor for detecting the longitudinal inclination angle of the vehicle is not separately provided, thereby achieving the load detection device 1 having a comprehensively reduced cost. At this time, however, the longitudinal inclination angle detecting portion may not necessarily be achieved by such software. For example, an inclination sensor as disclosed in JP2002-318113A may be provided, and the load correcting portion 6 may be configured in such a manner that the corrected load value WC is obtained on the basis of an inclination angle detected by the inclination sensor.

Further, the detected longitudinal inclination angle A1 is applicable not only to the correction of the load but also to an adjustment of an opening and closing operational force of a power sliding door or a swing door, a power adjustment at a time of the vehicle starting on a hill, and the like. The present embodiment may be applied to various systems and structures accordingly.

According to the aforementioned embodiment, the detected load value WA detected by the load sensors 1L, 1R and the load detecting portion 4 is corrected depending on the vehicle longitudinal inclination angle A1 detected by the longitudinal inclination angle detecting portion (i.e., the correlating portion 51, the vacancy determining portion 52, and the longitudinal inclination angle calculating portion 53). Thus, the influence caused by the vehicle longitudinal inclination angle is reduced so that the portion of the load of the seat occupancy of the seat 9 is accurately detected. As a result, the determination of whether the passenger on the seat 9 is the adult or the infant is highly accurately conducted.

According to the aforementioned embodiment, the load sensor includes two load sensors 1L and 1R provided at two of the support portions 96 and 97 respectively which are positioned at the rear portion of the seat 9 and which are away from each other in a width direction of the vehicle, and the load detecting portion 4 adds up outputs from the two load sensors 1L and 1R to detect the portion of the load of the seat occupancy.

Therefore, in a normal state where the passenger seated on the seat 9 leans on the seatback of the seat 9, the detected load value corresponding to a majority of the load of the passenger is obtainable, which results in the highly accurate determination of whether the passenger on the seat 9 is the adult or the infant. In addition, because the outputs of the load sensors 1L and 1R positioned away from each other in the width direction of the seat (vehicle) are added up, the detected load value is not influenced by a case where the vehicle is inclined either left or right, or a case where the passenger is seated, leaning to one side (left or right) of the seat 9. As a result, the highly accurate detection and determination are achievable.

Further, according to the aforementioned embodiment, the load correcting portion 6 performs either an addition or a multiplication of the correction value C relative to the detected load value WA. The correction value C is obtained beforehand on a basis of the relationship between the detected load value WA of the seat occupancy and the vehicle longitudinal inclination angle A1.

That is, the relationship between the detected load value WA of the seat occupancy of the seat 9 and the vehicle longitudinal inclination angle A1 is experimentally obtained beforehand for determining the correction value C, which is added to the detected load value WA or by which the detected load value WA is multiplied. As a result, the correction value C is prepared beforehand for the required accuracy of the determination of the passenger, thereby ensuring the detection accuracy and determination accuracy of the passenger seated on the seat 9.

Furthermore, according to the aforementioned embodiment, the longitudinal inclination angle detecting portion (i.e., the correlating portion 51, the vacancy determining portion 52, and the longitudinal inclination angle calculating portion 53) determines an inclination state of the vehicle to be one of plural inclination states which are classified in a stepwise manner on a basis of the detected longitudinal inclination angle A1, and the load correcting portion 6 corrects the detected load value WA of the portion of the load of the seat occupancy detected by the load detecting portion 4 depending on the inclination state determined by the longitudinal inclination angle detecting portion.

The vehicle longitudinal inclination angle A1 may be regarded as one of the inclination states classified in a stepwise manner depending on the accuracy required for the determination. Accordingly, the calculation and process after the load correction performed by the load correcting portion 6 may be effective.

Furthermore, according to the aforementioned embodiment, the load detecting portion 4 obtains the outputs of the load sensors 1L and 1R each predetermined sampling period T1 and outputs the detected load value WA. The longitudinal inclination angle detecting portion (i.e., the correlating portion 51, the vacancy determining portion 52, and the longitudinal inclination angle calculating portion 53) outputs the inclination state and the predetermined sampling period T1 is specified to be elongated in a case where the ignition switch of the vehicle is turned off and the longitudinal inclination angle detecting portion outputs the longitudinal inclination angle A1 and the predetermined sampling period T1 is specified to be shortened in a case where the ignition switch is turned on.

In a case where the ignition switch is turned off, the sampling period T1 is elongated so that the load sensors 1L and 1R are intermittently operated. In addition, after the operation by the load correcting portion 6, the simple calculation and process based on the inclination state of the vehicle is performed to thereby achieve saving power.

Furthermore, according to the aforementioned embodiment, the longitudinal inclination angle detecting portion (i.e., the correlating portion 51, the vacancy determining portion 52, and the longitudinal inclination angle calculating portion 53) includes the correlating portion 51 indicating the relationship between the detected load value WA output from the load detecting portion 4 in a case of no seat occupancy of the seat 9 and the longitudinal inclination angle A1, the vacancy determining portion 52 determining a vacant state of the seat 9 that indicates no seat occupancy in a case where the detected load value WA output from the load detecting portion 4 is smaller than the predetermined vacancy determination value W0, and the longitudinal inclination angle calculating portion 53 calculating the longitudinal inclination angle A1 correlated to the detected load value WA output from the load detecting portion 4 based on the correlating portion 51 in a case where the vacancy determining portion 52 determines the vacant state of the seat 9.

As a result, in order to detect the vehicle longitudinal inclination angle A1, hardware such as an inclination sensor is not required, thereby achieving the load detection device 1 with a comprehensively reduced cost.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A load detection device comprising:
a load sensor provided at a support portion that is positioned at a rear portion of a seat for a vehicle, the seat including a seatback at the rear portion of the seat, the load sensor detecting a load applied to the support portion that is a part of a plurality of support portions supporting the seat;
a load detecting portion detecting a portion of a load of a seat occupancy of the seat based on an output from the load sensor and outputting a detected load value;
a longitudinal inclination angle detecting portion detecting a longitudinal inclination angle of the vehicle;
a load correcting portion correcting, depending on the longitudinal inclination angle of the vehicle, the detected load value of the portion of the load of the seat occupancy detected by the load detecting portion based on a relationship between the detected load value of the seat occupancy of the seat and the longitudinal inclination angle of the vehicle;
wherein the longitudinal inclination angle detecting portion determines an inclination state of the vehicle to be one of plural inclination states which are classified in a stepwise manner on a basis of the detected longitudinal inclination angle of the vehicle, and the load correcting portion corrects the detected load value of the portion of the load of the seat occupancy detected by the load detecting portion depending on the inclination state determined by the longitudinal inclination angle detecting portion;
wherein the load detecting portion obtains the outputs of the load sensors each predetermined sampling period and outputs the detected load value, and
wherein the longitudinal inclination angle detecting portion outputs the inclination state and the predetermined sampling period is specified to be elongated in a case where an ignition switch of the vehicle is turned off and the longitudinal inclination angle detecting portion outputs the longitudinal inclination angle and the predetermined sampling period is specified to be shortened in a case where the ignition switch is turned on.

2. The load detection device according to claim 1, wherein the load sensor includes two load sensors provided at two of the support portions respectively which are positioned at the rear portion of the seat and which are away from each other in a width direction of the vehicle, and the load detecting portion adds up outputs from the two load sensors to detect the portion of the load of the seat occupancy.

3. The load detection device according to claim 1, wherein the load correcting portion performs either an addition or a multiplication of a correction value relative to the detected load value, the correction value being obtained beforehand on a basis of the relationship between the detected load value of the seat occupancy and the longitudinal inclination angle of the vehicle.

4. A load detection device comprising:
a load sensor provided at a support portion that is positioned at a rear portion of a seat for a vehicle, the seat including a seatback at the rear portion of the seat, the load sensor detecting a load applied to the support portion that is a part of a plurality of support portions supporting the seat;

a load detecting portion detecting a portion of a load of a seat occupancy of the seat based on an output from the load sensor and outputting a detected load value;

a longitudinal inclination angle detecting portion detecting a longitudinal inclination angle of the vehicle;

a load correcting portion correcting, depending on the longitudinal inclination angle of the vehicle, the detected load value of the portion of the load of the seat occupancy detected by the load detecting portion based on a relationship between the detected load value of the seat occupancy of the seat and the longitudinal inclination angle of the vehicle; and wherein the longitudinal inclination angle detecting portion includes a correlating portion indicating a relationship between the detected load value output from the load detecting portion in a case of no seat occupancy of the seat and the longitudinal inclination angle of the vehicle, a vacancy determining portion determining a vacant state of the seat that indicates no seat occupancy in a case where the detected load value output from the load detecting portion is smaller than a predetermined vacancy determination value, and a longitudinal inclination angle calculating portion calculating the longitudinal inclination angle of the vehicle correlated to the detected load value output from the load detecting portion based on the correlating portion in a case where the vacancy determining portion determines the vacant state of the seat.

* * * * *